(12) United States Patent  (10) Patent No.: US 8,382,348 B2
Kamiyama  (45) Date of Patent: Feb. 26, 2013

(54) DISPLAY DEVICE FOR VEHICLE

(75) Inventor: Hideaki Kamiyama, Saitama (JP)

(73) Assignee: Calsonic Kansei Corporation, Saitama-shi (JP)

( * ) Notice: Subject to any disclaimer, the term of this patent is extended or adjusted under 35 U.S.C. 154(b) by 316 days.

(21) Appl. No.: 12/863,873

(22) PCT Filed: Feb. 16, 2009

(86) PCT No.: PCT/JP2009/052552
§ 371 (c)(1),
(2), (4) Date: Jul. 21, 2010

(87) PCT Pub. No.: WO2009/104559
PCT Pub. Date: Aug. 27, 2009

(65) Prior Publication Data
US 2010/0296263 A1   Nov. 25, 2010

(30) Foreign Application Priority Data

Feb. 20, 2008   (JP) ................................. 2008-039275

(51) Int. Cl.
*B60Q 1/00* (2006.01)
(52) U.S. Cl. ............ 362/489; 362/23; 362/27; 362/227; 362/545

(58) Field of Classification Search ............... 362/23, 362/26–28, 227, 249.01, 487–489, 543–546
See application file for complete search history.

(56) References Cited

U.S. PATENT DOCUMENTS 6,499,852 B1 * 12/2002 Kino et al. ............... 362/23
2007/0035960 A1 * 2/2007 Birman et al. ........... 362/489

FOREIGN PATENT DOCUMENTS

| JP | 2003-021544 A | 1/2003 |
| JP | 2007-017166 A | 1/2007 |
| JP | 2007-212311 A | 8/2007 |

* cited by examiner

*Primary Examiner* — Meghan Dunwiddie
(74) *Attorney, Agent, or Firm* — Foley & Lardner LLP

(57) ABSTRACT

A display device includes a generally annular display (10) and a light source (3a) disposed to oppose a rear surface of the display (10). The display (10) is indicated by a rotatable pointer (4) and includes an indicator portion (12) disposed along a trace of displacement of a tip end portion (4a) of the pointer (4), and a transparent member (20) having a light incidence surface (a light incidence portion) (21) on which light from the light source (3a) is incident. The transparent member (20) is disposed on a front side of the indicator portion (12) and spaced from a front surface of the indicator portion (12) with a clearance (K) therebetween, and extends toward a center axis of the pointer (4).

10 Claims, 3 Drawing Sheets

DISPLAY DEVICE FOR VEHICLE

TECHNICAL FIELD

The present invention relates to a display device for a vehicle which includes a display having an indicator portion which is indicated by a rotatable pointer.

BACKGROUND ART

A vehicular display device is conventionally known, which includes a display having an indicator portion which is disposed along an arcuate trace of displacement of a tip end portion of a rotatable pointer (for instance, see Patent Literature 1).

The conventional vehicular display device includes a ring-shaped recessed portion which is formed along an outer circumference of the indicator portion. The recessed portion is configured such that an inclined side surface thereof is illuminated with light.

Patent Literature 1: Japanese Patent Application Unexamined Publication No. 2007-17166.

SUMMARY OF INVENTION

Incidentally, the vehicular display device may be provided with other members, such as a liquid crystal panel, an icon display and the like, in addition to the display having the indicator portion that is indicated by the pointer.

In such a case, it is difficult to increase a displaying area of the display having the indicator portion within the vehicular display device. Further, if the displaying area of the display is reduced, for instance, by decreasing a length of the pointer, there will occur problems such as deterioration in visibility.

In contrast, in the vehicular display device of the above-described Patent Literature 1, the ring-shaped recessed portion is formed along the outer circumference of the indicator portion, thereby causing the problem of increasing an entire area of the display.

The present invention has been made in view of the above problems. It is an object of the present invention to provide a vehicular display device capable of making the display prominent and noticeable without reducing the displaying area of the display with the indicator portion to thereby enhance a visibility of the display.

To solve the above conventional problems, in one aspect of the present invention, there is provided a vehicular display device including a generally annular display and a light source disposed to be opposed to a rear surface of the display, the display including an indicator portion which is indicated by a rotatable pointer and disposed along a trace of displacement of a tip end portion of the pointer upon rotation of the pointer, and a transparent member including a light incidence portion on which the light from the light source is incident, wherein the transparent member is disposed on a front side of the indicator portion and spaced from a front surface of the indicator portion with a clearance therebetween and extends toward a center axis of rotation of the pointer.

Further, in the vehicular display device, the indicator portion includes a plurality of linear scales extending in a radial direction of the display and characters disposed on an inside of the scales in the radial direction of the display, and the transparent member is disposed so as to cover an outer end portion of each of the scales in the radial direction of the display.

Further, in the vehicular display device, the transparent member includes a surface portion from which the light passing through the light incidence portion is emitted, and a satin finished surface is formed on the surface portion by subjecting a part of the surface portion to satin finish treatment.

Further, in the vehicular display device, the satin finished surface extends along an outer circumference of the display and is formed on a side of the center axis of rotation of the pointer.

According to the present invention, since the transparent member having the light incidence portion on which the light from the light source is incident is disposed on the front side of the indicator portion and spaced from the front surface of the indicator portion with a clearance therebetween, it is possible to provide such a luminescent region as to cover the indicator portion.

Further, since the transparent member extends toward the center axis of rotation of the pointer, the luminescent region formed by the transparent member is located at an outer circumferential periphery of the display. With this arrangement, the display can be made prominent to thereby increase the visibility without reducing the displaying area of the display.

Since the luminescent region that covers the indicator portion is formed by the transparent member, the indicator portion is visible through the transparent member. Therefore, even when the light is incident on the transparent member, the indicator portion can be prevented from suffering from deterioration in visibility.

Further, since the transparent member is disposed so as to cover the radial outer end portion of each of the linear scales of the indicator portion, the characters disposed on the radial inside of the scales can be free from being covered with the transparent member. Accordingly, it is possible to ensure visibility of the characters and surely recognize information indicated on the display.

Further, since the transparent member allows the light to emit from the surface portion thereof and the satin finished surface is formed on the surface portion by subjecting a part of the surface portion to satin finish treatment, the light emitted can be diffused on the satin finished surface to thereby enhance luminance of the transparent member and increase prominence of the transparent member.

Further, since the satin finished surface extends along the outer circumference of the display and is formed on the side of the center axis of rotation of the pointer, the satin finished surface can cover a middle portion of the indicator portion in the radial direction of the display. With this construction, it is possible to ensure visibility of the indicator portion and enhance luminance of the transparent member.

DESCRIPTION OF EMBODIMENT

In the following, a preferred embodiment of the present invention is explained by referring to the accompanying drawings.

Figure 1:
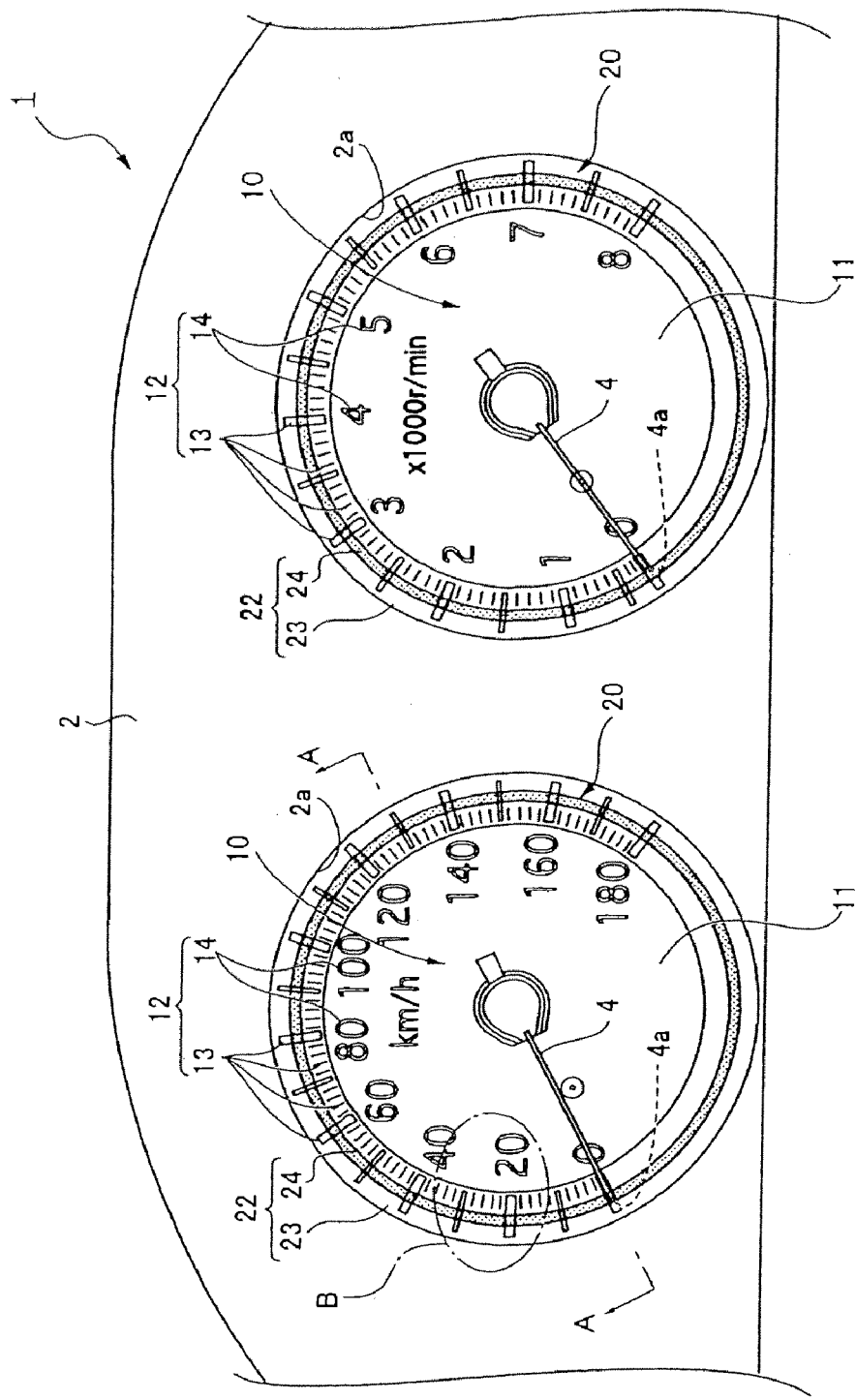
FIG. 1 is a front view of a vehicular display device according to an embodiment of the present invention.

A vehicular display device 1 as shown in FIG. 1 is a combination meter which is to be mounted to an instrument panel in a vehicle compartment.

The vehicular display device 1 includes a housing 7 (see FIG. 2) which is disposed on an inside of the instrument panel (not shown), and a display panel 2 which is attached to an open front surface of the housing 7 and exposed to an interior of the vehicle compartment. A pair of display openings 2a, 2a are formed in the display panel 2.

Figure 2:
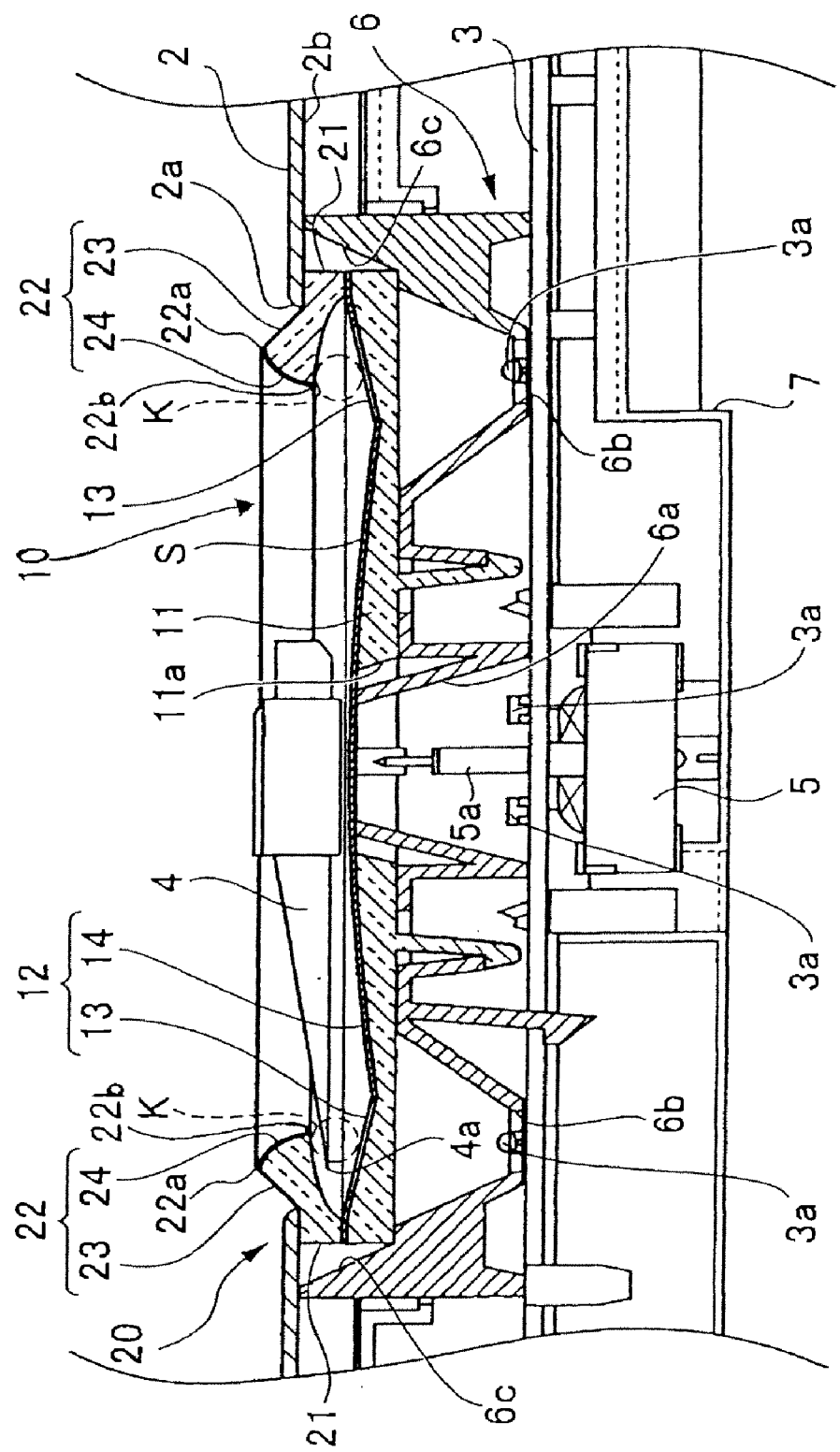
FIG. 2 is a sectional view of the vehicular display device, taken along line A-A as shown in FIG. 1.

As shown in FIG. 2, on the side of a rear surface 2b of the display panel 2, there are provided a base plate 3, a movement (a drive device) 5, an inner case 6 fixedly disposed between the display panel 2 and the base plate 3, and a display 10 supported by the inner case 6. A plurality of light sources 3a, . . . are mounted to the base plate 3 for emitting illumination light. The movement (drive device) 5 includes a rotatable shaft 5a which has a pointer 4 on a tip end thereof. The plurality of light sources 3a are disposed to be opposed to a rear surface of the display 10 in a direction of a rotation axis of the pointer 4 (a rotatable shaft 5a). These components are accommodated within the housing 7.

The inner case 6 is formed with shaft through hole 6a through which the rotatable shaft 5a extends, and a plurality of light source openings 6b, . . . in which the light sources 3a are located. The shaft through hole 6a and the light source openings 6b are configured so as to prevent interference with the rotatable shaft 5a and the light sources 3a.

The display 10 having a generally annular shape is exposed to an outside through the respective display openings 2a, 2b. The display 10 indicates various information relating to vehicle operating conditions such as vehicle speed, engine speed and the like.

The display 10 includes a generally annular dial board 11, an indicator portion 12 and a transparent member 20. The dial board 11 is formed with a through hole 11a (see FIG. 2) at a center thereof. The rotatable shaft 5a which rotates the pointer 4 extends into the through hole 11a. The indicator portion 12 is disposed at an outer circumferential periphery of the dial board 11 and formed into an arcuate shape along a trace of rotational displacement of a tip end portion 4a of the pointer 4. The transparent member 20 is disposed on a front side of the indicator portion 12 which is exposed to the interior of the vehicle compartment, and is spaced from a front surface of the indicator portion 12 with a clearance K (see FIG. 2) therebetween.

The dial board 11 is made of a light transmitting material having light transmitting property and has a light shielding paint layer S applied onto an outer surface of the dial board 11. The dial board 11 is disposed on a front side of the inner case 6. The pointer 4, the dial board 11, the inner case 6, the light sources 3a and the base plate 3 are arranged in this order from a front side, i.e., the side of the interior of the vehicle compartment toward a rear side of the vehicular display device 1 (from an upper side toward a lower side as shown in FIG. 2).

The dial board 11 extends underneath a rear side of each of the display openings 2a of the display panel 2 so as to overlap with an open periphery of the display panel 2 which define the display opening 2a.

As shown in FIG. 1, the indicator portion 12 includes a plurality of linear scales 13, . . . which extend in the radial direction of the display 10, and a plurality of characters 14, . . . which are disposed on an inside of scales 13, . . . in the radial direction of the display 10.

Figure 3:
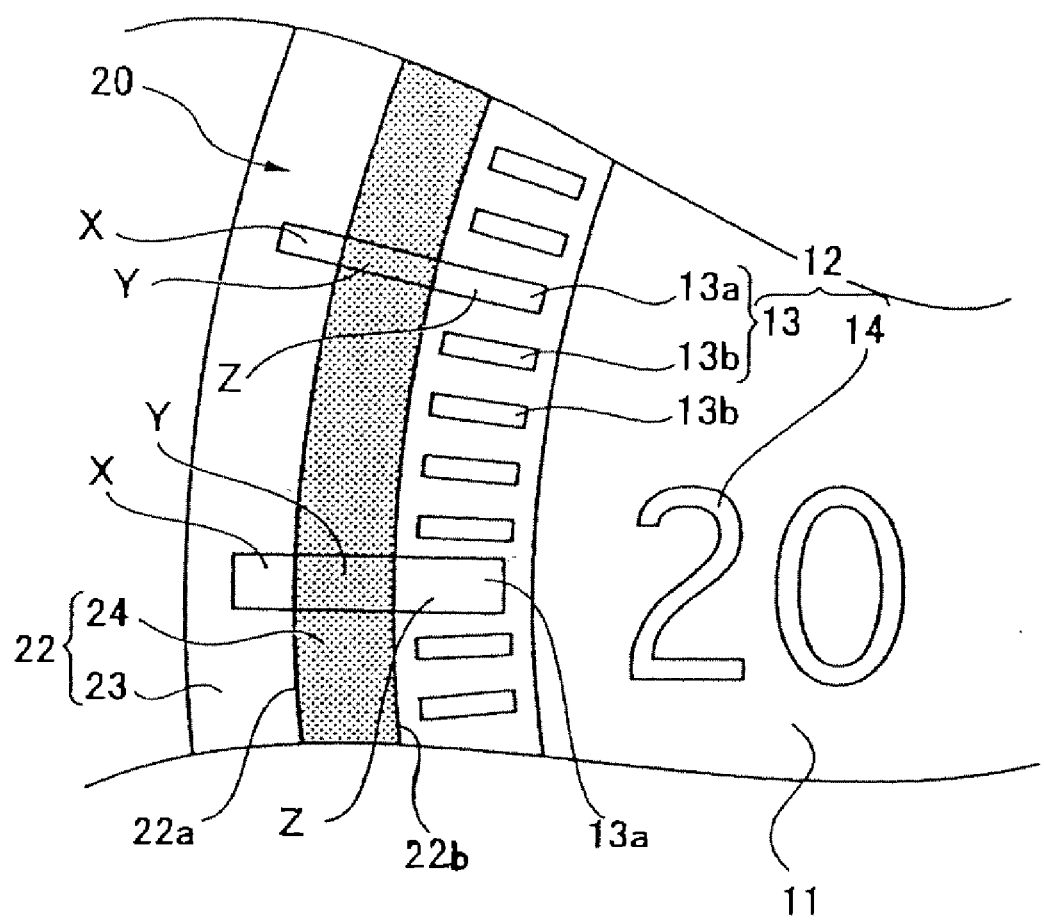
FIG. 3 is an enlarged view of part B as shown in FIG. 1.

In this embodiment, the plurality of linear scales 13, . . . include a plurality of longer scales 13a, . . . each having a longer entire length, and a plurality of shorter scales 13b, . . . each having a shorter entire length (see FIG. 3). Longer scales 13a and shorter scales 13b have end portions on the side of the through hole 11a of the dial board 11 which are aligned with each other in a circumferential direction of the dial board 11.

Longer scales 13a and shorter scales 13b are arranged such that two or more shorter scales 13b are disposed between the adjacent longer scales 13a in the circumferential direction of the dial board 11.

Further, the indicator portion 12 is constituted of portions on the dial board 11 which each have a predetermined shape and are free from being covered with the light shielding paint layer S applied to the surface of the dial board 11. Therefore, the light transmitting material of the dial board 11 is exposed at the indicator portion 12 so that the light from the light sources 3a can pass through the indicator portion 12 and be emitted therefrom.

On the other hand, the transparent member 20 is made of a colorless transparent acrylic resin and formed into an arcuate shape extending along the outer circumference of the display 10.

Further, the transparent member 20 is interposed between the display panel 2 and the dial board 11 and supported thereby. The transparent member 20 is disposed on the front side of the display 10 and exposed to the interior of the vehicle compartment. The transparent member 20 extends toward the through hole 11a of the dial board 11 into which the rotatable shaft 5a, that is, the center axis of rotation of the pointer 4, extends, such that the transparent member 20 covers an outer end portion of each of the scales 13, . . . extending in the radial direction of the display 10.

Specifically, the term "outer end portion of the scale 13" as used herein is intended to mean a portion of the longer scale 13a which is disposed between an end of the longer scale 13a on the outer circumferential side of the display 10 and a middle portion (not inclusive) of the longer scale 13a in the radial direction of the display 10. Further, the end portion of the longer scale 13a on the side of the through hole 11a of the dial board 11, and the shorter scale 13b are free from being covered with the transparent member 20.

The transparent member 20 interposed between the display board 2 and the dial board 11 has an outer circumferential surface which is opposed to a reflection surface 6c formed on the inner case 6. The outer circumferential surface of the transparent member 20 serves as a light incidence surface (a light incidence portion) 21 on which the light emitted from the light source 3a and reflected by the reflection surface 6c is incident.

The transparent member 20 further includes a surface portion 22 located on the dial board 11 and is configured to allow the light incident on the light incidence surface 21 to be emitted through the surface portion 22.

The surface portion 22 projects toward the front side of the vehicular display device 1, i.e., toward the front side of the display 10 (upwardly as shown in FIG. 2), that is, toward the interior of the vehicle compartment, and extends in a radially inward direction of the display 10. The surface portion 22 has a bend 22a at a middle portion thereof in the radial direction of the display 10. The bend 22a is formed so as to project most distantly toward the front side of the vehicular display device 1.

As shown in FIG. 2, the surface portion 22 includes a smooth surface 23 disposed above a radial outside region of the outer circumferential periphery of the display 10 and a satin finished surface 24 disposed above a radial inside region of the outer circumferential periphery of the display 10. The smooth surface 23 extends from a radially outer end of the surface portion 22 which is disposed at a peripheral edge of the display opening 2a of the display board 2, to the bend 22a. The satin finished surface 24 is disposed between the bend 22a and a radially inner end of the surface portion 22 which is disposed on the side of the through hole 11a.

The smooth surface 23 is smoothly machined and allows light to be emitted from the smooth surface 23 substantially without being refracted.

In contrast, the satin finished surface 24 is formed by satin finish treatment which is one of various kinds of surface treatments for providing fine irregularities (i.e., recesses and projections) on a surface of a workpiece. The satin finished surface 24 is configured to refract the light emitted from the satin finished surface 24 in various different directions and diffuse the emitted light. So-called blasting and frosting are substantially the same in meaning of surface treatment as the term "satin finish" as used in this embodiment.

Further, in this embodiment, the smooth surface 23 is inclined relative to the radial direction of the display 10 so as to flatly extend toward the front side of the display 10. The satin finished surface 24 is formed so as to slightly swell and curve toward a radial inside of the display 10 and the front side of the display 10.

Next, an operation of the vehicular display device 1 according to the embodiment of the present invention is explained.

In the vehicular display device 1, engine speed and vehicle speed are respectively indicated by the pair of displays 10, 10.

Upon indicating information on each of the displays 10, firstly, the value of predetermined parameter to be indicated on the display 10 is detected by a sensor (not shown) such as an engine speed sensor. Subsequently, a control command is outputted from a control section, not shown, to the movement 5a on the basis of the detected value. In response to the control command, the rotatable shaft 5a is rotated by a predetermined angle to thereby rotate the pointer 4.

Then, the indicator portion 12 is pointed by the tip end portion 4a of the pointer 4, so that predetermined information on the indicator portion 12 can be indicated.

Further, when the plurality of light sources 3a, . . . are lit, the light emitted from the respective light sources 3a passes through the dial board 11 made of the light transmitting material and is emitted from the scales 13 and the characters 14 of the indicator portion 12 which are not covered with the light shielding paint layer S. As a result, the indicator portion 12 is luminously indicated.

A part of the light emitted from the respective light sources 3a is reflected by the reflection surface 6c of the inner case 6 after passing through the dial board 11. The part of the light then is incident on the light incidence surface 21 of the transparent member 20 and emitted from the surface portion 22. As a result, the surface portion 22 of the transparent member 20 is luminously indicated.

The transparent member 20 is disposed on the front side of the indicator member 12 and spaced from the front surface of the indicator member 12 with the clearance K therebetween. The transparent member 20 also extends toward the through hole 11a of the dial board 11 into which the rotatable shaft 5a, i.e., the center axis of rotation of the pointer, extends.

With this arrangement of the transparent member 20, a luminescent region formed by the surface portion 22 can be provided on the transparent member 20. Further, the luminescent region formed by the surface portion 22 which is to be luminously indicated is located on the outer circumferential periphery of the display 10. With this arrangement of the luminescent region, the display 10 can be made prominent without reducing the displaying area thereof to thereby enhance visibility of the display 10.

Further, since the transparent member 20 is made of a colorless transparent acrylic resin, the indicator portion 12 can be visible through the transparent member 20. Therefore, even when light enters into the transparent member 20 and makes the surface portion 22 luminescent, the visibility of the indicator portion 12 can be maintained without being inhibited.

Further, since the tip end portion 4a of the pointer 4 is disposed within the clearance K between the dial board 11 and the transparent member 20, interference between the pointer 4 and the transparent member 20 can be prevented.

Further, in the embodiment as described above, the transparent member 20 is arranged to cover the radially outer end portions of the respective linear scales 13, . . . of the indicator portion 12.

With this arrangement of the transparent member 20, the plurality of characters 14, . . . provided on the radial inside of the scales 13, . . . can be free from being covered with the transparent member 20, respectively. Accordingly, the visibility of the characters 14 can be enhanced so that the information indicated by the display 10 can be surely recognized.

Further, in the embodiment as described above, the satin finished surface 24 is formed on the surface portion 22 of the transparent member 20 from which the light is emitted, by subjecting a part of the surface portion 22 to satin finish treatment.

With the provision of the satin finished surface 24, the light which is emitted through the satin finished surface 24 can be diffused to thereby enhance luminance of the transparent member 20 and further increase prominence of the transparent member 20.

Further, the satin finished surface 24 of the transparent member 20 extends along the arcuate outer circumference of the display 10 so as to be formed into the annular shape. The satin finished surface 24 is formed at a portion of the surface portion 22 which extends from the bend 22a formed at the middle portion in the radial direction of the display 10 to the radially inner end 22b located on the side of the through hole 11a.

That is, the satin finished surface 24 extends along the outer circumference of the display 10 and is formed on the side of the through hole 11a of the dial board 11 into which the rotatable shaft 5a, i.e., the center axis of the pointer 4, extends.

With this arrangement of the satin finished surface, as shown in FIG. 3, a portion (hereinafter referred to as an outer end portion X) of each of the longer scales 13a of the scales 13 of the indicator portion 12 which portion is located in the vicinity of an end of the display 10 on the outer circumferential side thereof is covered with the smooth surface 23 of the transparent member 20, and an intermediate portion Y is covered with the satin finished surface 24 of the transparent member 20. On the other hand, an end portion (hereinafter referred to as an inner end portion Z) of each of the longer scales 13a which is located on the side of the through hole 11a of the dial board 11 is free from being covered with the transparent member 20.

With this arrangement of the satin finished surface 24, even when the visibility of the intermediate portion Y of each of the longer scales 13a is deteriorated by the satin finished surface 24 which covers the intermediate portion Y, it is possible to recognize the presence of the longer scale 13a by the outer end portion X and the inner end portion Z both being certainly visible.

As a result, it is possible to ensure visibility of the indicator portion 12 and enhance luminance of the transparent member 20.

Further, in the embodiment as described above, the surface portion 22 of the transparent member 20 is provided with the bend 22a, the smooth surface 23 which extends from the bend 22a in the radially outward direction of the display 10, and the satin finished surface 24 which extends from the bend 22a in the radially inward direction of the display 10.

With this construction of the surface portion 22, it is possible to enhance stereoscopic visual property of the display 10 and make the display 10 more prominent to thereby enhance the visibility thereof.

Further, in the embodiment as described above, the satin finished surface 24 is slightly curved to swell in the radially inward and forward direction of the display. With this construction of the satin finished surface 24, the light which is emitted from the satin finished surface 24 can be diffused over a large area so that the luminescence of the transparent member 20 can be more increased.

The invention claimed is:

1. A vehicular display device comprising:
a generally annular display; and
a light source disposed to oppose a rear surface of the display,
wherein the display comprises:
an indicator portion indicated by a rotatable pointer, wherein the indicator portion is disposed along a trace of displacement of a tip end portion of the pointer upon rotation of the pointer; and
a transparent member including a light incidence portion on which light from the light source is incident,
wherein the transparent member is disposed on a front side of the indicator portion and spaced from a front surface of the indicator portion with a clearance therebetween and extends toward a center axis of rotation of the pointer,
wherein the indicator portion comprises a plurality of linear scales extending in a radial direction of the display and characters disposed on an inside of each of the linear scales in the radial direction of the display,
wherein the transparent member is disposed to cover an outer end portion of each of the linear scales in the radial direction of the display, and
wherein the transparent member comprises a surface portion from which light passing through the light incidence portion is emitted, and a satin finished surface formed on the surface portion by subjecting the surface portion to satin finish treatment.

2. The vehicular display device as claimed in claim 1, wherein the satin finished surface extends along an outer circumference of the display and is formed on a side of the center axis of rotation of the pointer.

3. The vehicular display device as claimed in claim 1, wherein the light incidence portion is disposed on an outer circumferential surface of the display.

4. The vehicular display device as claimed in claim 1, further comprising an inner case which supports the display, wherein the inner case comprises a reflection surface which reflects the light from the light source, and wherein the reflection surface is disposed on an outside of the light incidence portion in the radial direction of the display and opposed to the light incidence portion.

5. The vehicular display device as claimed in claim 4, wherein the display further comprises a dial board made of a light transmitting material, wherein the indicator portion is disposed on an outer circumferential periphery of the dial board, and wherein the dial board is disposed between the transparent member and the inner case.

6. The vehicular display device as claimed in claim 1, wherein the surface portion of the transparent member is formed to project toward a front side of the display and extend in a radially inward direction of the display, and
wherein a bend is formed at a middle portion of the surface portion of the transparent member in the radial direction of the display and projects most distantly toward the front side of the display, and
wherein the satin finished surface is formed on an inside of the bend in the radial direction of the display.

7. The vehicular display device as claimed in claim 1, wherein the satin finished surface is slightly swelled and curved toward a radial inside of the display and a front side of the display.

8. The vehicular display device as claimed in claim 1, wherein the satin finished surface is formed to cover an intermediate portion of each of the linear scales which is disposed between an outer end portion of each of the linear scales in the radial direction of the display and an inner end portion of each of the linear scales in the radial direction of the display.

9. The vehicular display device as claimed in claim 1, wherein a smooth surface is formed on the surface portion of the transparent member, and wherein the smooth surface is inclined with respect to the radial direction of the display and extends toward a front side of the display.

10. The vehicular display device as claimed in claim 9, wherein the smooth surface is formed so as to cover an outer end portion of each of the linear scales in the radial direction of the display.

* * * * *